Patented Sept. 2, 1924.

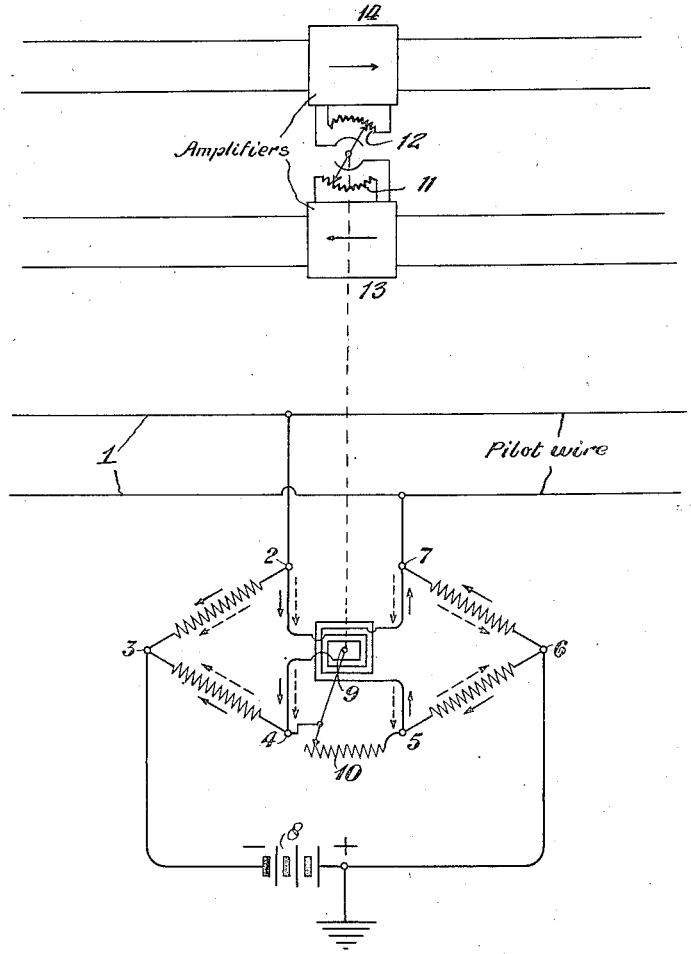

1,507,160

UNITED STATES PATENT OFFICE.

GEORGE CRISSON, OF HACKENSACK, NEW JERSEY, ASSIGNOR TO AMERICAN TELEPHONE AND TELEGRAPH COMPANY, A CORPORATION OF NEW YORK.

PILOT-WIRE REGULATOR SYSTEM.

Application filed December 30, 1922. Serial No. 609,911.

*To all whom it may concern:*

Be it known that I, GEORGE CRISSON, residing at Hackensack, in the county of Bergen and State of New Jersey, have invented certain Improvements in Pilot-Wire Regulator Systems, of which the following is a specification.

This invention relates to transmission circuits and more particularly to transmission circuits involving a pilot wire system designed to regulate the transmission equivalent of the circuits.

The object of the invention is to provide in such transmission circuits an arrangement of the pilot wire regulator system which will permit the use of a grounded battery in said system.

In the pilot wire system for regulating the transmission equivalent of transmission circuits disclosed in the U. S. Patent No. 1,438,219, granted to Alva B. Clark, there is included an automatically balanced Wheatstone bridge. It has been found that, if the battery which furnishes the operating current for this bridge is grounded, induction from conductors lying near the pilot wire in the cable causes irregular currents to flow in the galvanometer arm of the bridge, which currents in turn cause continual changes in the setting of the automatic bridge and corresponding changes of the gain in the repeaters. Therefore, it has been found necessary heretofore to use batteries which are not connected to the ground. For this reason it has been impossible to use for the operation of the regulator bridge the batteries ordinarily provided in repeater stations of long repeatered transmission circuits. For the same reason it has been impossible to connect more than one regulator to the same battery.

Applicant's arrangement permits the use of grounded batteries for the purpose of furnishing the operating current for the automatic bridge included in such a regulator system. Since the presence of a ground in one of these batteries allows currents due to interference from wires lying near the pilot wire in the cable to pass to ground through the bridge circuit, it is essential— in order that these current may not affect the balance of the bridge—that the impedance between the cable pair and the ground be the same, at all frequencies, for each of the two wires. If this requirement is not met, the currents which pass to ground as a result of the interference will have different values in the two wires, and the difference between the two values will have the same effect as a current flowing into one wire and out of the other. Accordingly any instrument connected so as to measure the resistance of the pilot wire will be affected. Secondly, the indicating device in the bridge circuit must be so constructed and connected that the currents passing through it due to the unbalancing of the bridge will cause it to give an indication, while those currents reaching it which are due to the external disturbances will be opposed to each other and have no effect upon the device.

Applicant's arrangement is designed to meet these two essential requirements, and will be fully understood when the following detailed description is read with reference to the accompanying drawing, in which the single figure is a diagram of the arrangement.

With reference to the details of the drawing, 1 represents the pilot wire, which, it is understood, is included in the cable with the transmission circuits. The ratio arms of the bridge are indicated as 2—3, 3—4, 5—6 and 6—7. The resistance of arm 2—3 equals the resistance of arm 6—7, and the resistance of arm 3—4 equals the resistance of arm 5—6. The battery 8, connected between the points 3 and 6 of the system, furnishes the operating current for the bridge, and is grounded. For purposes of clear illustration in connection with the following description of the operation of the system, the poling of this battery in this specific case is indicated in the drawing. A wire between the points 2 and 4 forms one winding and a wire between the points 7 and 5 forms the second winding of a polarized differential device 9. Examples of such a device are a polar relay and a differential galvanometer. In the drawing, as illustration, the latter is represented as one desirable form of the device. 10 indicates an adjustable resistance corresponding to resistance $R_6$ of the Clark Patent No. 1,438,219 referred to above, this resistance being automatically adjusted in the manner indicated in the said Clark patent, that is, when the galvanometer is deflected, the resistance is adjusted in accordance with the deflection of the galvanometer by mechanical means, so as to balance the bridge. As indicated in the above numbered Clark patent, the mechanical movement utilized to balance the bridge is also utilized to produce a corresponding change in the setting of the potentiometers 11 and 12 (corresponding to P$_3$ and P$_4$ of the above numbered Clark patent), the setting of these potentiometers controlling the amplification of amplifiers 13 and 14 of the transmission circuits, respectively, these amplifiers (which correspond to amplifiers A$_3$ and A$_4$ of the above numbered Clark patent) being shown symbolically. Thus there is effected a suitable change in the gain of the repeaters of the transmission circuits.

The operation of the system is as follows:

(1) When the bridge is balanced and the pilot wire undisturbed by interfering currents from the neighboring wires in the cable, there is no current flow in the galvanometer.

(2) When the resistance of the pilot wire falls, currents from the battery flow in the system as indicated by the solid arrows. It will be observed that the effects of these currents in the galvanometer are cumulative and the result is a deflection of the galvanometer. Likewise, if the resistance of the pilot wire rises, the flow of the currents in the galvanometer is in the reverse direction and results in a reverse deflection.

(3) If there is a positive impulse from the pilot wire, due to interfering currents from the neighboring wires in the cable, the resulting flow in the system is as shown by the broken arrows. It will be observed that the effects of the currents in the two windings of the galvanometer are opposed, and consequently there is no deflection of the galvanometer. Likewise, a negative impulse from the pilot wire produces currents in the opposite direction in each winding of the galvanometer, and these currents, being opposed to each other, cause no deflection.

What is claimed is:

1. A system for the automatic regulation of the transmission equivalent of electrical circuits, said system comprising a pilot wire, a balance bridge including said pilot wire as one of its arms, a grounded battery connected across said bridge, a polarized differential device having two windings, connections from the windings of said device to the bridge, said connections being such that currents due to external disturbances and flowing to ground over the two sides of the pilot wire will produce a differential effect in said windings, and an automatically adjusted means for varying the gain of repeaters in the transmission circuits according to the deflection of said device.

2. A system for the automatic regulation of the transmission equivalent of electrical circuits, said system comprising a pilot wire, a balance bridge including said pilot wire as one of its arms, a grounded battery connected across said bridge, a polarized differential device having two windings, connections from the windings of said device to the bridge, said connections being such that currents flowing in the system due to the unbalancing of the bridge will have a cumulative effect in the two windings, and currents due to external disturbances will produce effects opposite to each other in the two windings, and an automatically adjusted means for varying the gain of repeaters in the transmission circuits according to the deflection of said device.

3. A system for the automatic regulation of the transmission equivalent of electrical circuits, said system comprising a pilot wire, a balance bridge including said pilot wire as one of its arms, a grounded battery connected across said bridge, a differential galvanometer having two windings, connections from the windings of said galvanometer to the bridge, said connections being such that currents due to external disturbances and flowing to ground over the two sides of the pilot wire will produce a differential effect in said windings, and an automatically adjusted means for varying the gain of repeaters in the transmission circuits according to the deflection of said galvanometer.

4. A system for the automatic regulation of the transmission equivalent of electrical circuits, said system comprising a pilot wire, a balance bridge including said pilot wire as one of its arms, a grounded battery connected across said bridge, a differential galvanometer having two windings, connections from the windings of said galvanometer to the bridge, said connections being such that currents flowing in the system due to the unbalancing of the bridge will have a cumulative effect in the two windings, and currents due to external disturbances will produce effects opposite to each other in the two windings, and an automatically adjusted means for varying the gain of repeaters in the transmission circuits according to the deflection of said galvanometer.

5. In a system for the automatic regulation of the transmission equivalent of electrical circuits, a balance bridge including a pilot wire as one of its arms, a grounded battery connected across said bridge, a polarized differential device having two windings, and connections from the windings of said device to the bridge, said connections being such that currents flowing to ground over the two sides of the pilot wire will produce a differential effect in the two windings.

6. In a system for the automatic regulation of the transmission equivalent of electrical circuits, a balance bridge including a pilot wire as one of its arms, a grounded battery connected across said bridge, a polarized differential device having two windings, and connections from the windings of said device to the bridge, said connections being such that currents flowing in the system due to the unbalancing of the bridge will have a cumulative effect in the two windings, and currents due to external disturbances will produce effects opposite to each other in the two windings.

7. In a system for the automatic regulation of the transmission equivalent of electrical circuits, a balance bridge including a pilot wire as one of its arms, a grounded battery connected across said bridge, a differential galvanometer having two windings, and connections from the windings of said galvanometer to the bridge, said connections being such that currents due to external disturbances and flowing to ground over the two sides of the pilot wire will produce a differential effect in said windings.

8. In a system for the automatic regulation of the transmission equivalent of electrical circuits, a balance bridge including a pilot wire as one of its arms, a grounded battery connected across said bridge, a differential galvanometer having two windings, and connections from the windings of said galvanometer to the bridge, said connections being such that currents flowing in the system due to the unbalancing of the bridge will have a cumulative effect in the two windings, and currents due to external disturbances will produce effects opposite to each other in the two windings.

In testimony whereof, I have signed my name to this specification this 29th day of December, 1922.

GEORGE CRISSON.